Jan. 22, 1957 N. A. WHITTAKER 2,778,054
BUTCHERING AND SKINNING DEVICES
Filed Jan. 11, 1954
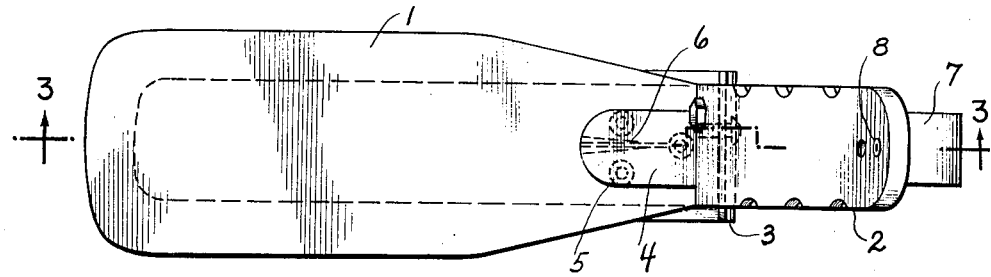
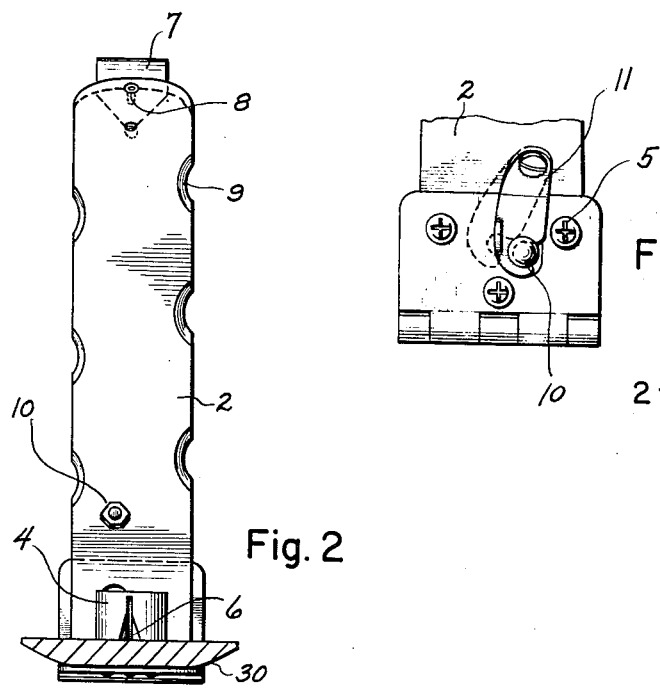
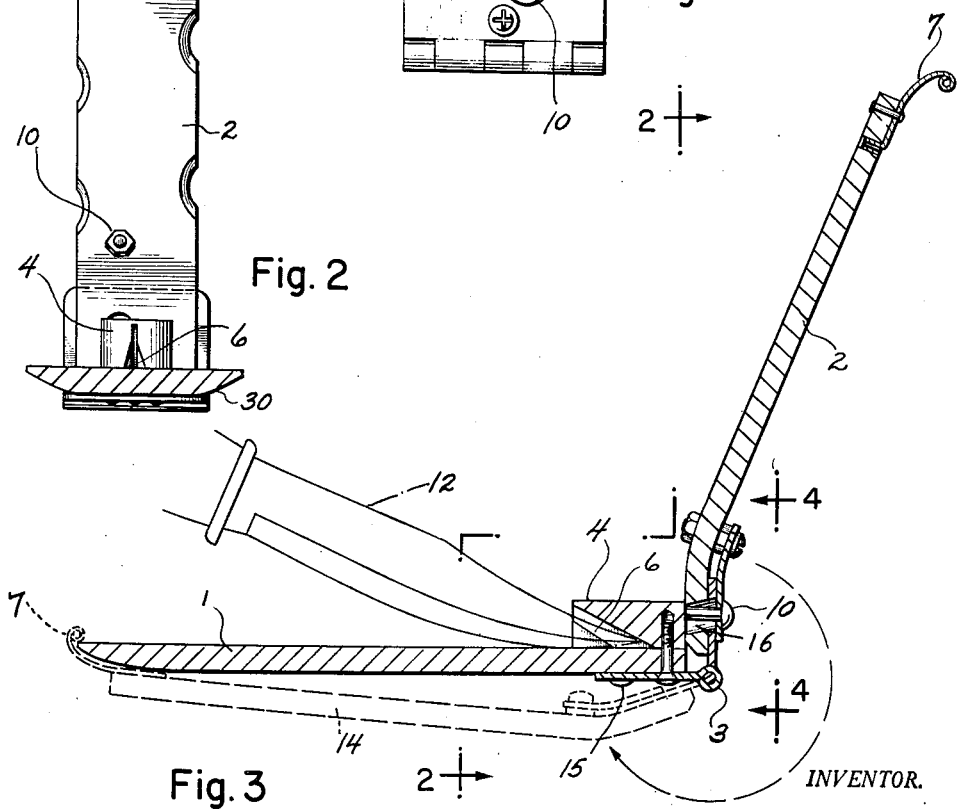
INVENTOR.
Norman A. Whittaker
BY Henry J. Gorin
Attorney.

United States Patent Office 2,778,054
Patented Jan. 22, 1957

2,778,054

BUTCHERING AND SKINNING DEVICES

Norman A. Whittaker, Seattle, Wash.

Application January 11, 1954, Serial No. 403,212

6 Claims. (Cl. 17—1)

My invention relates to butchering and skinning devices especially useful in butchering and skinning large animals and convenient and effective to hunters who butcher and skin game killed on their hunting expeditions.

I know of no such device to be conveniently had today. The methods now in use are slow, dangerous, and do not produce so complete and clean a result as does my device.

A principal object of my invention is to provide a simple device which will not only disembowel the carcass of an animal, but will lay back the membranes and skin as well.

Another object is to provide such a tool which is safe in use and does not render the user liable to injuries.

A further object of my device is to provide a portable, compact device, comparatively inexpensive, effective, and which may be carried in the belt of the user or other convenient place.

Other objects of my invention will appear in the attached drawing and specification in which:

Fig. 1 is a view of my device partially in perspective showing it in open position.

Fig. 2 is a side elevational view of my device, partially in section, closed and in upright position, and taken as indicated by the line 2—2 in Figure 3.

Fig. 3 is a sectional view of the device on the line 3—3 in Figure 2, showing it in opened position and a knife positioned in relation thereto, and ready to be operated.

Figure 4 is a detail showing the locking device, taken as indicated by the line 4—4 in Figure 3.

Reference numeral 1 indicates in its entirety, the broad leaf or skin support which has its edges beveled as at 30, 2 the narrow leaf or handle portion of the device, 3 a hinge, 4 the block or knife support, 6 the slot therein adapted to receive the point of a knife blade, 7 the clasp securing leaves 1 and 2 when the device is folded, 8 means for securing portion of clasp 7 to leaf 2, 9 indicates finger grips on leaf 2, 15 securing means for hinge 3 to leaves 1 and 2, 10 nut and pin, 11 a locking means to secure rigidity in the tool when same is in use, 12 skinning blade inserted in block 4 and 14 indicated position of blades when unlocked and swung one against the other upon the hinge 3.

The method of operation of my device is as follows: When it is desired to skin and dress the carcass of an animal an incision is made in its under belly, at its throat or in the anal region, sufficiently broad to receive the large beveled leaf 1 after the carcass is hung or positioned as desired.

The leaves 1 and 2 are unclasped and the narrow leaf 2 is advanced until its progress is arrested by the block 4; it then will be found that pin 10 has been thrust through the aperture in blade 2, the slotted locking member 11 is then swung around on hinges so that the slot therein engages and holds firmly the said pin 10 thrust through the aperture 16 in leaf 2. The device is now locked rigidly. With the leaves 1 and 2 thus locked and leaf 2 in a substantially perpendicular position and leaf 1 substantially in an horizontal position, the blade of the skinning knife is thrust in the slot 6 in block 4, with its cutting edge positioned downwardly.

The operator then inserts the broad leaf in the incision in the carcass and grasping the leaf 2 which has finger grips 9 on each side, pulls downwardly. The skin, membranes and fatty tissue of the carcass will be held on the non-bevelled surface of leaf 1 and be slit by the downwardly thrusting and firmly secured cutting edge 12. The user thus has a minimum of blood, fat, skin and tissue to contend with and impede the speed of the operation. This is largely due to the bevelled portion of leaf 1 which separates the outer hide and inner tissues backwardly on either side of the cutting line as it increases in length during the operation as it thus operates as a guard between the muscular tissue and skin preventing the cutting or releasing of any of the contents of the entrails.

The final result is that the entrails can be cleanly removed and disposed of and the hide will be initially separated from the carcass on either side of the incision, thus enabling the user to more readily and conveniently remove the hide of the animal.

It is readily seen that my device provides the means for securing a speedier, cleaner and more effective job of butchering and skinning large animals and game which is dressed in the woods.

The very important item of safety in use should not be overlooked. My invention insures against cuts and wounds and possible serious infection therefrom.

Finally the device is cleaned and folded back and secured by the clasp 7 as shown in Fig. 2. In this position the device may be carried conveniently and safely in the pocket of the user or hung from his person by looping a line or thong between leaves 1 and 2 and attaching the line to his belt or buttonhole.

Having described my invention, I claim:

1. A skinning and butchering device comprising two leaves in opposed relation and hingeably connected, one of said leaves being tapered around its sides, means forming an aperture in one leaf, a pin attached to the other leaf positioned to thrust through the said aperture, means for locking said pin beyond said aperture, a block mounted on one of the leaves, and means forming a slot in said block adapted to receive a cutting edge therein.

2. A skinning and butchering device comprising two leaves in opposed relation and hingeably connected, one leaf being tapered along its outer edges, a block secured upon the upper surface of said one leaf, having a slot therein adapted to receive a cutting blade, a pin secured to said block, means forming a hole in said other leaf in registry with said pin and adapted to receive it therethrough, and a rotatable catch to receive and secure said pin so that the leaves are secured in an approximately right angle relationship.

3. A skinning and butchering device comprising two members disposed in angular relation to each other, one of said members forming a skin support and being insertable through an opening in the skin of an animal, the other said members forming a handle, and means providing a knife support on one of said members, said means having a slot extending at a right angle to said one member and adapted to receive a knife with its cutting edge in engagement with the surface of said skin support.

4. A skinning and butchering device, as recited in claim 3, in which said skin support has a tapered end edge on the side thereof opposed to the skin engaging side.

5. A skinning and butchering device comprising a flat skin support insertable through an opening in the skin of the animal and adapted to be engaged with the underside of the skin, a handle portion connected to and projecting from said skin support, and a knife support carried by said device and having means forming a knife supporting slot adjacent the skin supporting surface of said skin support, said slot being adapted to receive a knife with its cutting edge in engagement with the surface of the skin support.

6. A skinning and butchering device, as recited in claim 5, in which the slot of the slot forming means has its entrance end tapering inwardly from adjacent said skin engaging surface to a narrow knife blade supporting portion.

References Cited in the file of this patent

UNITED STATES PATENTS

| | | |
|---|---|---|
| 1,099,885 | Peple | June 9, 1914 |
| 2,603,866 | Rice | July 22, 1952 |
| 2,636,245 | Stout | Apr. 28, 1953 |